United States Patent [19]

Hollis et al.

[11] Patent Number: 5,156,055

[45] Date of Patent: Oct. 20, 1992

[54] ASCENT RATE METER FOR SCUBA DIVERS

[75] Inventors: Robert Hollis, San Leandro; John E. Lewis, Rancho Palos Verdes, both of Calif.

[73] Assignee: American Underwater Products, Inc., Calif.

[21] Appl. No.: 602,495

[22] Filed: Oct. 24, 1990

[51] Int. Cl.⁵ .............................. G01F 23/14
[52] U.S. Cl. .................. 73/865.1; 364/413.31
[58] Field of Search .......... 73/865.1, 714, 299, 73/300, 301; 364/413.31; 128/201.27

[56] References Cited

U.S. PATENT DOCUMENTS

| | | | |
|---|---|---|---|
| 3,992,948 | 11/1976 | D'Antonio et al. | 364/413.31 |
| 4,107,995 | 8/1978 | Ligman et al. | 73/300 |
| 4,109,140 | 8/1978 | Etra | 235/92 |
| 4,604,737 | 8/1986 | Hoffman | 364/413.31 |
| 4,658,358 | 4/1987 | Leach et al. | 73/865.1 |
| 4,753,117 | 6/1988 | Osterhout et al. | 73/865.1 |
| 4,782,338 | 11/1988 | Barshinger | 364/413.31 |
| 4,882,678 | 11/1989 | Hollis et al. | 364/413.31 |
| 4,926,703 | 5/1990 | Budinger | 73/865.1 |

Primary Examiner—Hezron E. Williams
Assistant Examiner—George M. Dombroske
Attorney, Agent, or Firm—Ernest H. McCoy

[57] ABSTRACT

An ascent rate meter for a SCUBA diver gauge including sensor means for measuring time and pressure and a processor for combining that data according to a mathematical equation and displaying the estimated ascent rate on the display with a particular indicia.

13 Claims, 1 Drawing Sheet

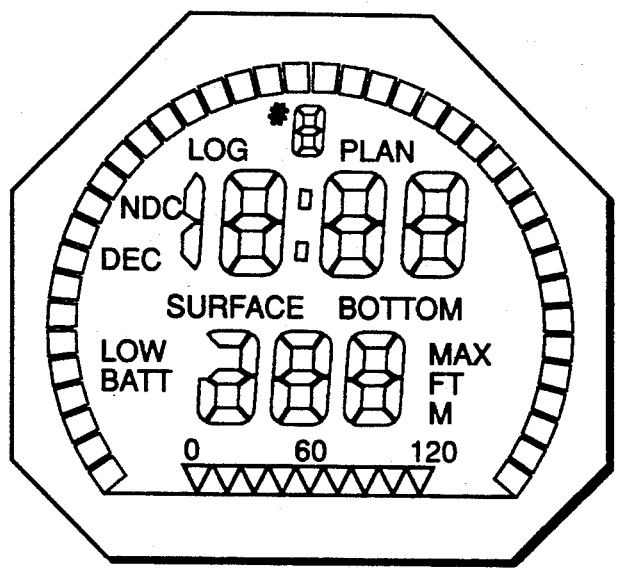
FIG._1
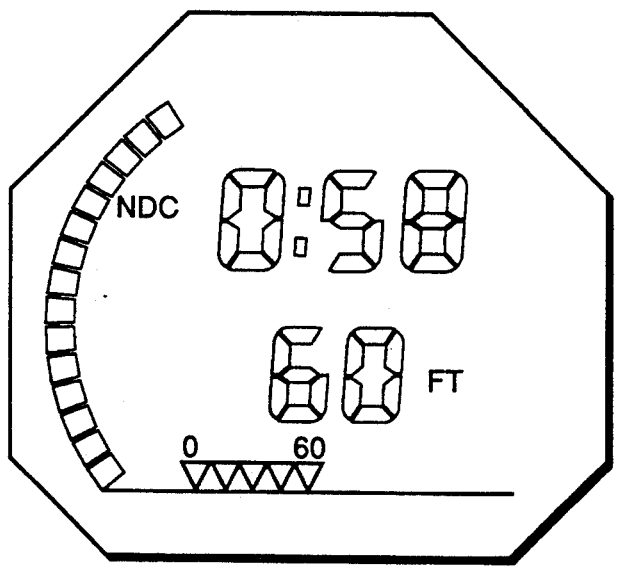
FIG._2
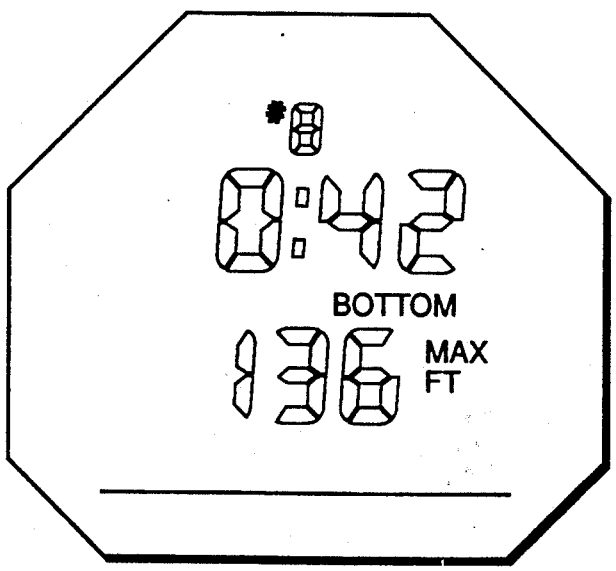
FIG._3

ASCENT RATE METER FOR SCUBA DIVERS

BACKGROUND OF THE INVENTION

1. Field of the Invention

The present invention relates to dive meters for SCUBA (self-contained underwater breathing apparatus) divers, and more particularly, to an ascent rate meter for a portable data sensor, processor, and display mounted in a waterproof case for continuously determining the ascent rate of a SCUBA diver during an underwater dive.

2. Description of the Prior Art

There are many types of dive meters for SCUBA divers which have been designed for the purpose of aiding a SCUBA diver during a decompression ascent to avoid the bends. They are data sensing and processing devices which comprise sensors, computers, and display gauges which sense depth, pressure in the diver's air tank, dive time, and contain the U.S. Navy dive tables or a modification thereof in the computer memory to provide an integrated information readout on the displays of the meters.

In addition, there are more sophisticated devices which aid an underwater sport diver to avoid the necessity of a decompression ascent. Reference is made to U.S. Pat. No. 4,882,678 issued Nov. 21, 1989, to some of the co-inventors of the present invention entitled, "Data Sensing and Processing Device for SCUBA Divers," which describes the latter type meter.

It has been determined that there is an important parameter of information for SCUBA divers which has not been incorporated in the meters of the prior art before the advent of the present invention. That is an ascent rate meter.

Runaway ascents for SCUBA divers can lead to decompression sickness and air embolism, and thus the control of ascent rates is generally recognized as an important safety issue. However, in order for a diver to control his ascent rate, it is necessary for the diver to have an accurate means of knowing just what that ascent rate actually is. The purpose of the present invention is to establish a means for accurately calculating a diver's ascent rate in order that this information can be added to the displays of dive meters presently used by SCUBA divers for sport and commercial diving.

SUMMARY OF THE INVENTION

The present invention is an ascent rate meter for a SCUBA diver which can be integrated into a portable device which can be taken underwater by a diver in a waterproof case. The meter continuously determines and displays the diver's ascent rate during an underwater dive. Ascent rate is a term that is used to mean the rate of change of depth with time or mathematically the first derivative of depth with respect to time. If, for example, the ascent rate were a constant one foot-per-second, the depth would decrease by one foot each and every second. The present invention includes a data sensor which has a means for measuring the ambient hydrostatic pressure or depth periodically and a means for measuring time. The two measuring means are mounted in the case and produce data sensor output signals. A data processor is provided which includes a simulating means responsive to the data sensor output signals and combines the signals for estimating the ascent rate by determining an average rate of change of depth with time over a specified period. A means is provided for upgrading the estimate and producing data processor output signals. A display is provided for indicating the estimated ascent rate. In the preferred embodiment of the invention, the display includes a bar graph having an aligned triangular shaped indicia to differentiate the bar graph from other data indicia which appears on the display.

OBJECTS OF THE INVENTION

It is therefore an important object of the present invention to provide an ascent rate meter for use by a SCUBA diver for accurately determining the diver's estimated rate of ascent at any time during an underwater dive.

It is another object of the present invention to provide a new and novel means for displaying the ascent rate on the meter display with a bar graph having a unique configuration to differentiate the ascent rate display from other indicia representing data also appearing on the display.

And it is a further object of the present invention to provide a preferred arithmetic equation for determining the estimated ascent rate which is to be displayed on the meter.

Other objects and advantages of the present invention will become apparent when the apparatus of the present invention is considered in conjunction with the accompanying drawings.

DESCRIPTION OF THE DRAWINGS

FIG. 1 is an illustration of a dive meter showing the display thereof with all of the meter data indicia activated as occurs in the diagnostic test mode;

FIG. 2 is an illustration of the meter display of FIG. 1 showing the meter during an underwater dive in the ascent mode; and FIG. 3 is an illustration of the dive meter of FIG. 1 showing an alternative display of the meter which automatically replaces the display of FIG. 2 for short periods of time during a dive.

DESCRIPTION OF THE PREFERRED EMBODIMENT

Reference is made to the drawings for a description of the preferred embodiment of the present invention wherein like reference numbers represent like elements on corresponding views.

The Apparatus

The present invention is an ascent rate meter for a portable underwater dive meter for a SCUBA diver which has data sensors, a processor, and a display mounted in a waterproof case. FIG. 1 in the drawings is an illustration of a display representation for such a gauge showing the various information which may be shown thereon. A detailed description of the information that can be displayed on the gauge is disclosed in the previously-referenced U.S. Pat. No. 4,882,678 of the prior art by the present inventors. Essentially all of the same information of the prior art patent is set forth on the gauge illustrated in the drawings of the present invention with the addition of the ascent rate meter which is disclosed herein which is supplemental to the information taught by the prior art. The configuration of the miniaturized new gauge allows it to be substituted into a standard dive meter gauge console in place of a standard depth gauge.

In order to design an ascent rate meter, it is obviously necessary to measure the ambient hydrostatic pressure or depth to determine its time rate of change, and this can be done by standard means and commercially available apparatus. The type selected for use in the present invention uses a pressure transducer that generates a predictable voltage for a given depth. It produces an analog electrical signal that is directly related to depth. An analog circuit could be designed that would differentiate this analog signal and thus produce a second analog signal that would be proportional to the rate of change of depth or the ascent rate. However, the preferred design uses an analog-to-digital converter to produce digital depth data at specified constant time sampling intervals. The digital option has been chosen for the ease of readout. A microprocessor is used to store and to manipulate the digital depth data received from the depth sensor according to a specific mathematical algorithm incorporated into the microprocessor. This information can be displayed either digitally or in a bar graph, but the preferred design uses a bar graph because it is believed to be the easiest display for the diver to read and differentiate from other data appearing on the display of a dive meter.

All dive computers periodically sample depth at regular intervals and generally at a rate of approximately one depth sample every one second. Other sampling intervals would work and, if the depth measurement were relatively accurate every time, it would be a simple matter to subtract the last measured depth of the diver from the earlier sampled depth and equate the difference to the ascent rate in units of distance per units of time, but anything much greater than a ten-second interval would result in an estimate that could be considerably in error. However, even if the depth measurement in each sample were exact, which it is not, a diver's variability in actual ascent rate would lead to a noisy and perhaps confusing readout. If the time difference between samples were chosen to be one second, the resulting estimate of the ascent rate based on only two samples can be expected to be very noisy, as a result of the instantaneous ascent rate of the diver, motions of the portable device, and electronic noise. If the difference is much greater than ten seconds, the device will not be responsive to real changes in the diver's rate of ascent. In order to avoid these problems, and to allow for random noise in the depth measurement, a preferred mathematical analysis has been devised.

Both the analog and digital voltages from the depth sensor will consist of noise as well as the pure depth signal. Since part of the noise is electronic and part of the noise is motion of the sensor that may not represent the true ascent of the diver, the elimination of this noise, which would produce an inaccurate measurement, and a disconcerting highly variable measurement that would be of a reduced valve to the diver, is an important element of the present design. It has been achieved for the preferred digital design by using more than two adjacent samples of the data, which would be the simplest but noisiest possible solution. Another possible design solution would be to choose only two samples but two that were not adjacent. For example, one could choose to estimate the rate by choosing samples that were five seconds apart, or ten seconds apart, etc. In the present invention, the inventors have chosen as the preferred design solution to sample depth approximately every second and to use all of the samples over a particular period, a time interval of seven seconds which consists of eight samples, to evaluate the ascent rate that produces the "best" fit to the data. Specifically, the arithmetic solution which has been chosen for the ascent rate calculation minimizes the mean square of the difference from the data and the linear fit and is the mathematical optimum estimate of the average rate of ascent over the selected period.

The mathematical estimate of the rate of ascent is renewed or upgraded continuously. This should be done approximately every second or in integers of seconds of time such as every one, two or three seconds, but if too long a time period is utilized, the ascent rate showing on the dive meter display may not be as current or as responsive as it is possible to provide. In the preferred embodiment of the invention, the estimate is upgraded every second by using a new set of eight samples that always represent the previous seven-second history of the diver's ascent. The set of eight samples is a subjective choice, e.g., seven or nine could have been chosen and would work reasonably well, but the number cannot be too small because of noise. For instance, two would be very noisy as previously described. On the other hand, the number cannot be too large because this would cause the design to be unresponsive to any changes in the diver's ascent rate. Twenty samples would represent his average rate ten seconds earlier, and would most likely be a poor measure of his present rate. The noise problem could also be solved for an analog electrical circuit with an appropriate time scale, e.g., in the range of five to ten seconds.

The Mathematical Solution

If the diver's ascent was made at a constant ascent rate, the depth, D, could be expressed in terms of the ascent rate, $A_R$, and the time elapsed after the ascent began, $\delta T$, by the expression:

$$D = D_O - A_R \delta T$$

where $D_O$ is the depth at the beginning of the ascent. The task is to find the value of $A_R$ that produces the "best fit" of this equation to the sampled data, which will not, in general, fall on this mathematical straight line. "Best" in this case means the least-mean-square deviation of the data from the fit, which can be expressed as:

$$\Sigma[D_i - D_O + A_R \delta T_i]^2 = \text{a minimum}$$

where the sum is for i=1 to N, and N is the maximum number of samples that is to be used for the estimate.

This statement can be converted into two independent equations by differentiating it with respect to the two unknowns $D_O$ and $A_R$ and setting the resulting equations equal to zero; a procedure which insures a minimum. These two equations for the two unknowns are:

$$\Sigma[D_i - D_O + A_R \delta T_i] = 0$$

$$\Sigma[D_i - D_O + A_R \delta T_i]\delta T_i = 0$$

and the resulting expression for $A_R$ is:

$$A_R = [\Sigma D_i \Sigma \delta T_i - N \Sigma D_i \delta T_i]/[N \Sigma \delta T_i^2 - \Sigma \delta T_i \Sigma \delta T_i]$$

Fortunately, normal diver ascent rates and the uniform sampling selected for use in the dive meter of the present invention utilizing integers of time in seconds, and particularly one second, leads to a much simpler equation:

$$A_R = [(N-1)/2\Sigma D_i - \Sigma D_i(i-1)/[N/12(N^2-1)]\Delta T$$

where $\Delta T$ is the depth sampling interval in seconds.

This equation is further simplified for specific choices of N, and $$A_R = [D_1 - D_2]/\Delta T; N = 2$$

$$A_R = [3 D_1 + D_2 - D_3 - 3 D_4]/10 \Delta T; N = 4$$

$$A_R = [5 D_1 + 3 D_2 + D_3 - D_4 - 3 D_5 - 5 D_6]/35 \Delta T; N = 6$$

$$A_R = [7 D_1 + 5 D_2 + 3 D_3 + D_4 - D_5 - 3 D_6 - 5 D_7 - 7 D_8]/84 \Delta T; N = 8$$

[Note that where $\Delta T$ equals one second, $\Delta T$ drops out and the units of these equations result in feet-per-second, and these values must be multiplied by 60 if the desired units are feet-per-minute.]

The final design issue and the critical one is a selection of N, the number of samples, and in order to make this choice, an ascent rate must be simulated. The problem is what rate of ascent should be chosen to select the optimum value of N. A simulated rate too high or low in comparison with actual diver ascent rates means the selected value of N for use in the ascent rate meter does not fit the measurements to be made and results in an unreliable ascent rate estimate. It has been determined through extensive trial and error and underwater diving experience that for accurate ascent rate estimation it is necessary to use a simulated ascent rate where each depth measurement corresponds to a uniform rate of ascent of one foot-per-second but with a random depth variation ranging between zero and one foot. The maximum percentage deviation that occurred during 100 realizations can then be determined. The results of this simulation are presented below:

| N | Maximum % Error |
|---|---|
| 2 | 91 |
| 4 | 25 |
| 6 | 13 |
| 8 | 9 |

On the basis of this simulation, the value of N=8 has been chosen which can be expected to have an accuracy of better than 9% providing that the depth noise is random and less than one foot.

Thus, the final equation inputted to the computer for the simulation to be used to estimate the ascent rate where $\Delta T$ is one second is:

$$A_R = [7D_1 + 5D_2 + 3D_3 + D_4 - D_5 - 3D_6 - 5D_7 - 7D_8]/1.4$$

where $A_R$ is the ascent rate in units of feet-per-minute, $D_8$ is the present depth in units of feet, $D_7$ is the depth one second earlier, $D_6$ is the depth two seconds earlier, $D_5$ is the depth three seconds earlier, $D_4$ is the depth four seconds earlier, $D_3$ is the depth five seconds earlier, $D_2$ is the depth six seconds earlier, and $D_1$ is the depth seven seconds earlier.

Ascent Rate Display

In addition to the mathematical formula which has been derived for preparing a representation of the estimated ascent rate, a novel means of illustrating the ascent rate on the display in the meter to prevent confusion for the diver has been devised. With so much information available from the meter display, it is necessary to simplify and distinguish the various readouts. The ascent rate display includes a bar graph having an aligned triangular shaped indicia to differentiate the bar graph from other indicia representing digital and other bar graph data. Since the ascent rate can vary between zero and as much as 120 feet-per-minute, those limits have been selected for representation on the face of the display with numerical designations placed on the bar graph for that purpose.

The ascent rate is represented by a series of triangular indicia which are illuminated on the LCD to indicate an ascent rate with the middle of the graph representing 60 feet-per-minute, or one foot-per-second, which has been determined to be a preferred nominal or proven acceptable ascent rate for a SCUBA diver. A particular configuration of the indicia are considered important for the reason that they differentiate from other LCD graphical representations which can be spaced around the display of the dive meter and particularly in a decompression bar graph which is displayed thereon in a semi-circular arc of rectangular or square blocks. The preferred form consists of the triangular shaped indicia having two of their corners disposed adjacent to the corners of the adjacent triangular indicia. This graph can be either curved or straight but the preferred form utilizes equilateral indicia and having one of their sides arranged along a straight line.

Thus, it will be apparent from the foregoing description of the invention, in its preferred form, that it will fulfill all the objects and advantages attributable thereto. While it is illustrated and described in considerable detail herein the invention is not to be limited to such details as have been set forth except as may be necessitated by the appended claims.

We claim:

1. An ascent rate meter for a SCUBA diver which continuously determines and displays the diver's rate of ascent from depth comprising
   data sensor means for measuring time in integers of seconds of time and sampling ambient hydrostatic pressure (depth) periodically, said data sensor means producing discrete digital data sensor output signals,
   a data processor including
      a simulating means responsive to said data sensor output signals for arithmetically combining more than two depth samples for estimating the ascent rate by determining an average rate of change of depth with time over a specified period,
      a means for upgrading this estimate periodically and producing data processor output signals, and
   a display for indicating the estimated rate of ascent.

2. The ascent rate meter of claim 1 wherein the simulating means utilizes the least-mean-square curve fit of the depth samples as a function of time whose slope is the ascent rate estimate.

3. The ascent rate meter of claim 2 wherein the estimate of ascent rate is upgraded every one second.

4. The ascent rate meter of claim 3 wherein the data sensor samples the depth periodically in integers of seconds of time and the simulating means utilizes eight samples and the simulating means utilizes the mathematical equation:

$$A_R = [7D_1 + 5D_2 + 3D_3 + D_4 - D_5 - 3D_6 - 5D_7 - 7D_8]/1.4 \Delta T$$

to estimate the ascent rate.

5. The device of claim 4 wherein the ascent rate is displayed graphically.

6. The ascent rate meter of claim 1 wherein the means for displaying the estimated ascent rate on the display includes a bar graph having aligned triangular shaped indicia to differentiate the bar graph from other indicia representing data appearing on said display.

7. An ascent rate meter for a SCUBA diver which continuously determines and displays the diver's rate of ascent from depth comprising data sensor means for measuring time and sampling ambient hydrostatic pressure (depth) periodically, said data sensor means producing discrete digital data sensor output signals, a data processor including a simulating means responsive to said digital data sensor output signals for arithmetically combining more than two depth samples for estimating the ascent rate by determining an average rate of change of depth with time over a specified period, a means for upgrading the estimated ascent rate periodically, means for producing data processor output signals, and a bar graph display for indicating the estimated ascent rate, said bar graph having aligned triangular shaped indicia to differentiate the bar graph from other indicia representing data appearing on said display.

8. The device of claim 7 wherein the simulating means utilizes the least-mean-square curve fit of the depth samples as a function of time whose slope is the ascent rate estimate.

9. The device of claim 8 wherein the data sensor samples the depth every one second and the simulating means utilizes eight samples and the simulating means utilizes the mathematical equation:

$$A_R = [7D_1 + 5D_2 + 3D_3 + D_4 - D_5 - 3D_6 - 5D_7 - 7D_8]/1.4$$

to estimate the ascent rate and the estimate of ascent rate is upgraded approximately every one second.

10. The ascent rate meter of claim 9 wherein the means for displaying the estimated ascent rate on the display includes a bar graph having aligned triangular shaped indicia to differentiate the bar graph from other indicia representing data appearing on said display, said triangular shaped indicia being equilateral and having two of their corners disposed adjacent to the corners of the adjacent indicia.

11. The ascent rate meter of claim 10 wherein the indicia have one of their sides arranged along a straight line.

12. An ascent rate meter for a SCUBA diver which continuously determines and displays the diver's rate of ascent from depth comprising data sensor means for measuring time and sampling ambient hydrostatic pressure (depth) every second, said data sensor means producing discrete digital data sensor output signals, a data processor including a simulating means responsive to said digital data sensor output signals for combining eight depth samples arithmetically utilizing the mathematical equation:

$$A_R = [7D_1 + 5D_2 + 3D_3 + D_4 - D_5 - 3D_6 - 5D_7 - 7D_8]/1.4$$

to estimate the ascent rate and the estimate of ascent rate is upgraded every one second, a bar graph display for indicating the estimated ascent rate, said bar graph having aligned triangular shaped indicia to differentiate the bar graph from other indicia representing data appearing on the display.

13. The ascent rate meter of claim 12 wherein the bar graph indicia are equilateral and have one of their sides arranged along a straight line.

* * * * *